Dec. 20, 1949     K. H. LIND     2,491,989
WHEEL CHOCK
Filed June 20, 1945
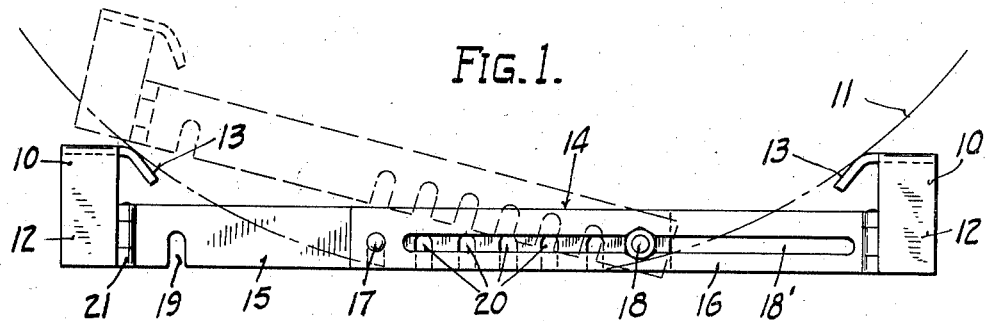
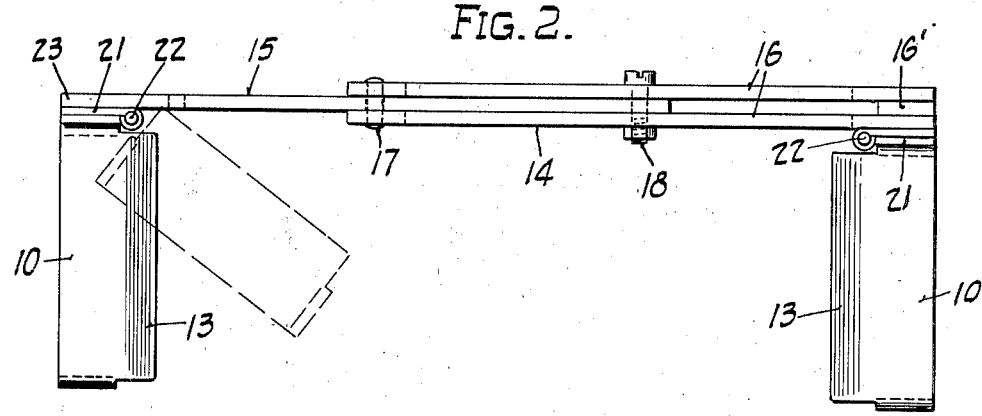
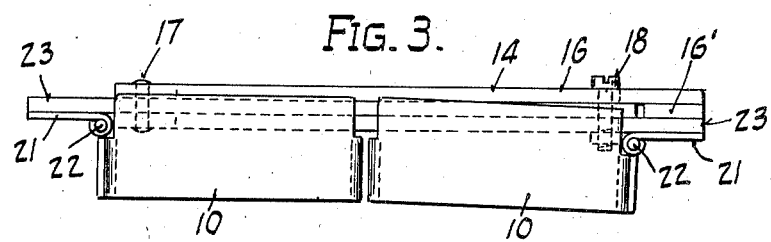
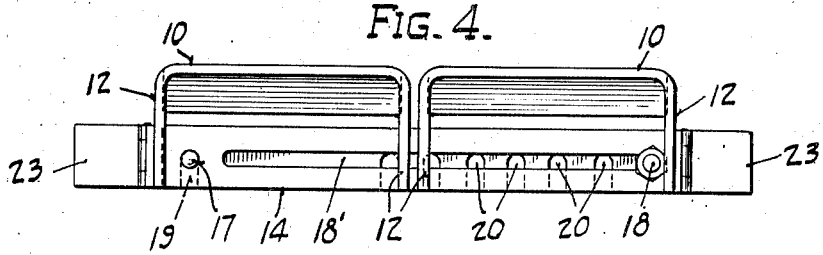
Kenneth H. Lind
INVENTOR.
BY *Ralph W. Brown*
ATTORNEY.

Patented Dec. 20, 1949

2,491,989

UNITED STATES PATENT OFFICE 2,491,989

WHEEL CHOCK

Kenneth H. Lind, La Crosse, Wis.

Application June 20, 1945, Serial No. 600,537

3 Claims. (Cl. 188—32)

This invention relates to wheel chocks for use primarily in blocking an automobile or other road vehicle against movement while changing a tire or making other emergency repairs.

One object of the present invention is to provide a wheel chock of simple, light weight, and economical design which may be readily inserted beneath a vehicle tire while resting on a roadway to effectively block the vehicle against movement in any direction.

Another object is to provide a wheel chock of the character mentioned capable of easy adjustment and adaptation to tires of different sizes.

Another object is to provide a wheel chock of the character mentioned which may be collapsed or folded into a small compact unit for ready storage between periods of use.

Other more specific objects and advantages will appear, expressed or implied, from the following description of an illustrative embodiment of the present invention.

In the accompanying drawings:

Figure 1 is a view in side elevation of a wheel chock constructed in accordance with the present invention illustrating the use thereof.

Fig. 2 is a top plan view thereof.

Fig. 3 is a top plan view illustrating the same in collapsed or folded condition.

Fig. 4 is a side elevation view of the folded unit.

The wheel chock selected for illustration includes a pair of chocking members 10 adapted to be projected beneath a vehicle tire (indicated by the broken line 11 in Fig. 1) fore and aft of the area of contact of the tire with the roadway or other supporting surface. In this instance each member 10 comprises a metal rail formed of heavy sheet or plate stock fashioned to provide a pair of vertical end supports 12 and an inclined tire-engaging lip 13 extending along one edge thereof.

The chocking members 10 are connected by suitable linkage 14 which functions to rigidly sustain the same in parallel relation, suitable for effective chocking, when positioned in the manner above described. This linkage is connected to one end only of each chocking member so as to leave the other ends thereof free for insertion beneath the tire. This linkage is also lengthwise adjustable to adapt the device to tires of different sizes and to permit the unit to be collapsed into a relatively small compact bundle. Linkage for these purposes may assume various forms but that shown has proven satisfactory.

The linkage shown comprises a single bar 15 attached at one end to an end of one of the chocking members 10 and slidably confined between a pair of spaced parallel bars 16 similarly attached to the corresponding end of the other chocking member 10. The spacing between bars 16 is fixed by a spacer block 16' therebetween at one end thereof and by a cross pin 17 fixed therein at the opposite end thereof. A bolt 18, carried by an end of the bar 15 and projecting through longitudinal slots 18' in the bars 16, provides a rockable and extensible connection therebetween. The cross pin 17 in bars 16 is engageable in a notch 19 or in any one of a series of notches 20 in the bar 15 to releasably lock the bars in any position of longitudinal adjustment.

The end of each chocking member 10 is preferably attached to the connecting linkage through a suitable hinge 21 whose pintle 22 extends vertically across the face of the linkage so as to permit each of the chocking members to be swung from the projecting position of Fig. 2 to a position substantially parallel to and adjacent the linkage, as shown in Figs. 3 and 4. It will be noted that in the device shown each hinge pintle 22 is disposed well within the adjacent end of the linkage so that the projecting end 23 of the linkage functions as a stop to limit the outward swing of the adjacent chocking member and to rigidly sustain the latter in the projected chocking position shown in Fig. 2.

Between periods of use the device is ordinarily maintained in the compact folded condition shown in Figs. 3 and 4 with the linkage 14 collapsed, with the cross-pin 17 of bars 16 engaged in the notch 19 of bar 15 to maintain the collapsed condition, and with the chocking members 10 folded inward toward each other and adjacent the linkage. To prepare the same for use the chocking members 10 are usually first swung into the projecting positions shown, the cross-pin 17 is disengaged from the notch 19, the linkage is extended to obtain the desired spacing between the chocking members, and the pin 17 engaged with one of the notches 20 to maintain this spacing, it being understood that disengagement and engagement of the pin 17 to and from the notches 19 and 20 is effected by suitable swinging action between the bars 15 and 16 about the bolt 18.

Various changes may be made in the embodiment of the invention hereinabove specifically described without departing from or sacrificing the advantages of the invention as defined in the appended claims.

I claim:

1. A wheel chock comprising a pair of chocking rails lengthwise projectable laterally beneath a tire fore and aft of the area of contact thereof with a supporting surface, longitudinally adjustable linkage between said rails reacting thereon to sustain the same in chocking position, said rails being disposed substantially wholly at one side of said linkage to permit ready entry of said rails beneath the tire, and a hinge connection between said linkage and an end of each of said rails, said hinge connection being disposed to permit each of said rails to be folded from a projected chocking position into a position substantially parallel to said linkage.

2. A wheel chock comprising a pair of chocking rails lengthwise projectable laterally beneath a tire fore and aft of the area of contact thereof with a supporting surface, connecting linkage reacting on said rails to sustain the same in chocking position, said rails being disposed wholly at one side of said linkage, and a hinge connection between said linkage on an end of each of said rails to permit the latter to be swung from an inactive position adjacent said linkage to a chocking position projecting from said linkage.

3. A wheel chock comprising a pair of chocking rails lengthwise projectable crosswise and beneath a tire fore and aft of the area of contact thereof with a supporting surface, connecting linkage reacting on said rails to sustain the same in chocking position, said rails being disposed substantially wholly at one side of said linkage and swingable relative thereto from an inactive position adjacent said linkage to a chocking position projecting laterally from said linkage, said linkage comprising bars lengthwise adjustable relative to each other to vary the spacing between said rails, and means on one of said bars coacting with the other of said bars to releasably retain the same in adjusted position.

KENNETH H. LIND.

REFERENCES CITED

The following references are of record in the file of this patent:

UNITED STATES PATENTS

| Number | Name | Date |
|---|---|---|
| 340,880 | Johnson | Apr. 27, 1886 |
| 694,266 | Griesser | Feb. 25, 1902 |
| 2,117,026 | Kennedy | May 10, 1938 |

FOREIGN PATENTS

| Number | Country | Date |
|---|---|---|
| 331,148 | Germany | Dec. 31, 1920 |
| 675,784 | France | Nov. 8, 1929 |